Aug. 23, 1966     L. B. WARBURTON     3,267,960
AUTOMATIC DRAIN VALVE
Filed Aug. 19, 1963
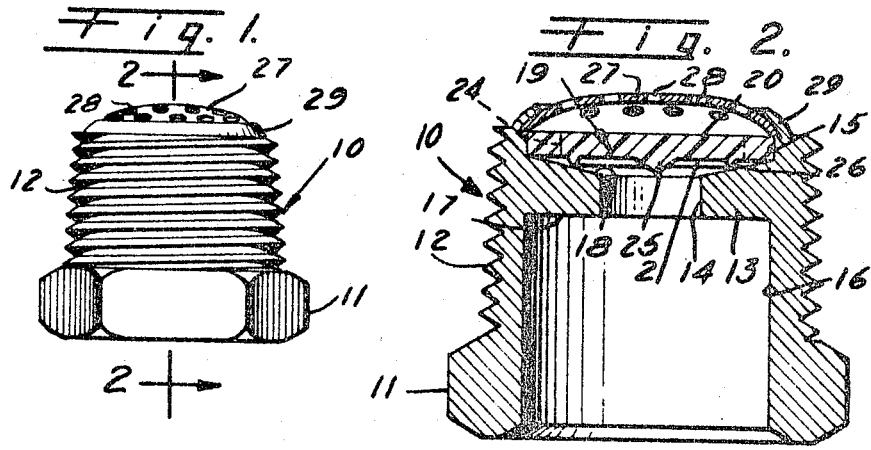
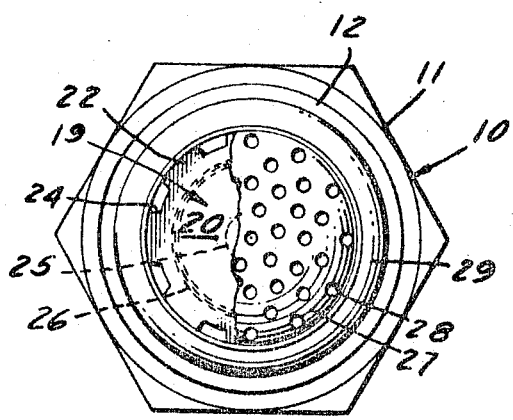
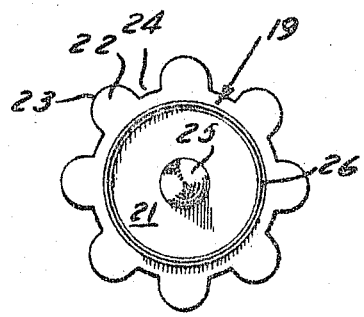
Leslie B. Warburton,
INVENTOR.
WHANN & McMANIGAL
Attorneys for Applicant
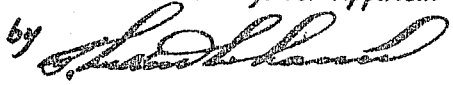

United States Patent Office 3,267,960
Patented August 23, 1966

3,267,960
AUTOMATIC DRAIN VALVE
Leslie B. Warburton, Downey, Calif., assignor to Thompson Manufacturing Company, Los Angeles, Calif., a corporation of California
Filed Aug. 19, 1963, Ser. No. 302,988
2 Claims. (Cl. 137—517)

The present invention relates generally to valves and is more particularly concerned with improvements in drain valves of the automatic type for use in connection with sprinkler and irrigation systems, but which is susceptible of general application.

It is conventional practice, for example, in sprinkler systems to provide at a low point of the sprinkler water supply header, a relief or drain valve which will be in a closed position during operation of the sprinklers; but will automatically open, when the header is disconnected from the supply source, so as to drain the remaining water from the header.

Heretofore, valves for such purpose have in the main comprised the use of a spring urged ball of steel or other material. Such valves have been generally unsatisfactory for the reason that economic production has necessitated the use of materials which are subject to corrosion which will effect the valve operating efficiency eventually. Further, such valves are inherently quick acting and are thus inclined to chatter and otherwise set up undesirable noises during operation.

Having in mind the foregoing as well as other inherent disadvantages of presently available valves for the herein described purpose, the herein described invention has for one object the provision of an improved automatic drain valve which will be non-corrosive, simple and economical of construction, which will provide trouble free operation for long periods of use under extremely variable conditions, and which will be quiet in operation.

A further object of the invention is to provide a valve having a unique diaphragm valving arrangement which will gradually open and close, and which will open at a predetermined low fluid pressure and automatically close when the fluid pressure is increased.

Still another object is to provide in accordance with the present invention, an improved article of manufacture embodying a unique diaphragm construction which may be utilized with drain valves such as described herein.

Further objects of the invention will be brought out in the following part of the specification, wherein detailed description is for the purpose of fully disclosing the invention without placing limitations thereon.

Referring to the accompanying drawings, which are for illustrative purposes only:

FIG. 1 is an elevational view of a drain valve embodying the features of the herein described invention;

FIG. 2 is an enlarged vertical section of the same, taken substantially on line 2—2 of FIG. 1;

FIG. 3 is an enlarged top plan view, portions being cut away to disclose internal parts thereof; and FIG. 4 is a detail view of the valve diaphragm as it appears in plan view as seen on its under surface.

Referring more specifically to the drawings, for illustrative purposes, the drain valve of the present invention is constructed in the form of a screw plug having a body structure 10 of tubular formation, and being exteriorly provided with a multisided end portion 11 which is adapted to receive a wrench or other tool during installation of the valve or removal. Extending from the end portion 11, the body is exteriorly threaded substantially throughout its length, as indicated at 12.

As best shown in FIG. 2, the tubular body structure is internally provided with a partition or baffle wall 13 having a central passage 14 of reduced diameter, this passage having its ends respectively communicating with enlarged bore portions 15 and 16. The annular surface 17 facing the bore portion 16 is radial, while the annular surface 18 facing the bore portion 15 is frusto-conical due to its being outwardly and upwardly inclined from the central passage 14.

A diaphragm 19 of resilient material is mounted in the bore portion 15 in valving relation with respect to the annular surface 18. Any of a number of suitable available materials may be utilized for the diaphragm, but it is desirable that the material should be non-corrosive, and after deflection return to its normal state. Plastics of vinyl resin type have been found to have particular desirable characteristics for this purpose.

Referring particularly to FIG. 4, the diaphragm is of disc-like construction and may be molded or otherwise formed so as to have in general parallel opposite surfaces 20 and 21. The peripheral margin of the diaphragm is formed with radially extending lobes 22, having rounded outer end edges 23. The lobes are circumferentially spaced apart so as to provide openings or notches 24 which provide in effect flow passages for fluid at the periphery of the diaphragm. Centrally, the diaphragm is strengthened by a thickened conical portion 25 which extends from the diaphragm surface 21. In concentric relation to the central portion 25 and slightly inwardly spaced from the notches 24, there is provided a circular rib or projection 26 of substantially triangular cross section to provide a line valve seat in cooperation valving relationship to the adjacent surface 18.

As shown in FIG. 2, the diaphragm is constructed with a diameter such that the tip ends of the lobes 22 will engage the wall surface of the bore portion 15, when the ends of the lobes are seated on the peripheral margin of the annular surface 18. As so seated, the circular rib 26 will be disposed between the perihperal openings or notches 24, and the adjacent end of the central passage 14.

In the mounted position, the diaphragm extends across or bridges the central passage 14. The diaphragm is retained in mounted position in the body structure 10 by the outer edge of a cup-shaped strainer member 27 provided with a plurality of perforations or openings 28 for fluid passage. The strainer member is retained by means of a projecting integrally formed end flange 29 at this end of the body structure. By bending or otherwise deflecting the flange 29 over the peripheral margin of the strainer, the strainer is fixedly anchored and also serves to retain the diaphragm in its mounted position.

The valve of the present invention is particularly suitable for use at low pressures. The diaphragm 19 is so designed that in the absence of a fluid acting on the diaphragm the seating edge of the rib 26 will closely clear the adjacent surface 18. In practice, the normal spacing for this clearance would be in the order of substantially .047". With this clearance, the valve will start to seat at approximately 2½ pounds pressure, and will open to drain the system when the pressure goes below approximately 2½ pounds pressure. By designing the diaphragm so that this clearance is more or less, it is possible to accommodate the drain valve for operation at greater or less pressure than the 2½ pounds. The amount of clearance between the rib 26 and the adjacent surface 18 will determine the rate of flow of liquid in its passage from the peripheral openings or notches 24 to the central passage 14, and as a consequence of this restriction pressure will build up on the upper side of the diaphragm when the supply of liquid is greater than that which can pass through the valve clearance. When this condition prevails, the diaphragm will be deflected in a valve closing position, this action taking place more or less gradually.

Various modifications may suggest themselves to those skilled in the art without departing from the spirit of my invention, and, hence, I do not wish to be restricted to the specific form shown or uses mentioned, except to the extent indicated in the appended claims, wherein various portions have been separated for clarity of reading and not for emphasis.

I claim:

1. As an article of manufacture, a drain valve unit, comprising:
   (a) a hollow cylindrical screw plug body having an externally threaded inner end;
   (b) an interior transverse baffle wall adjacent said inner end having a central bore of reduced diameter communicating at said inner end with a surrounding annular seating surface, the other end of said bore being open to atmosphere;
   (c) a relatively flat diaphragm disc of resilient material extending over said annular seating surface;
   (d) a plurality of integral spaced apart radially extending lobes at the disc periphery providing passages therebetween for low pressure fluid flow inwardly to the bore between said annular surface and adjacent surface of said diaphragm;
   (e) a projecting circular rib carried by said diaphragm for engaging said seating surface radially outwardly of said bore upon flexure of said diaphragm disc towards said seating surface, said rib being normally closely spaced with respect to said seating surface; and
   (f) means cooperative with the peripheral margin of said seating surface for clampingly engaging the tip ends of said lobes to anchor said diaphragm.

2. As an article of manufacture, a drain valve unit, comprising:
   (a) a hollow cylindrical screw plug body having an externally threaded inner end;
   (b) an interior transverse baffle wall adjacent said inner end having a central bore of reduced diameter communicating at said inner end with a surrounding annular seating surface, the other end of said bore being open to atmosphere;
   (c) a relatively flat diaphragm disc of resilient material extending over said annular seating surface;
   (d) a plurality of integral spaced apart radially extending lobes at the disc periphery providing passages therebetween for low pressure fluid flow inwardly to the bore between said annular surface and adjacent surface of said diaphragm;
   (e) a projecting circular rib carried by said diaphragm for engaging said seating surface radially outwardly of said bore upon flexure of said diaphragm disc towards said seating surface, said rib being normally closely spaced with respect to said seating surface; and
   (f) a cupped strainer secured at the inner end of said body extending over said diaphragm, said strainer having its peripheral margin in clamping engagement with the tip ends of said lobes.

References Cited by the Examiner

UNITED STATES PATENTS

| | | | |
|---|---|---|---|
| 2,404,578 | 7/1946 | Liska | 137—525 X |
| 2,497,906 | 2/1950 | Peters | 137—525 X |
| 2,555,597 | 6/1951 | Nault | 138—43 |
| 2,989,086 | 6/1961 | Dahl | 138—43 |
| 3,073,339 | 1/1963 | Stelzer | 137—525 X |
| 3,097,280 | 7/1963 | Schimming | 137—498 X |

FOREIGN PATENTS 897,679  11/1953  Germany.

WILLIAM F. O'DEA, *Primary Examiner.*

H. COHN, *Assistant Examiner.*